May 19, 1942. L. P. LOUTREL 2,283,816
GRIP HANDLE FOR FISHING RODS
Filed Oct. 10, 1941
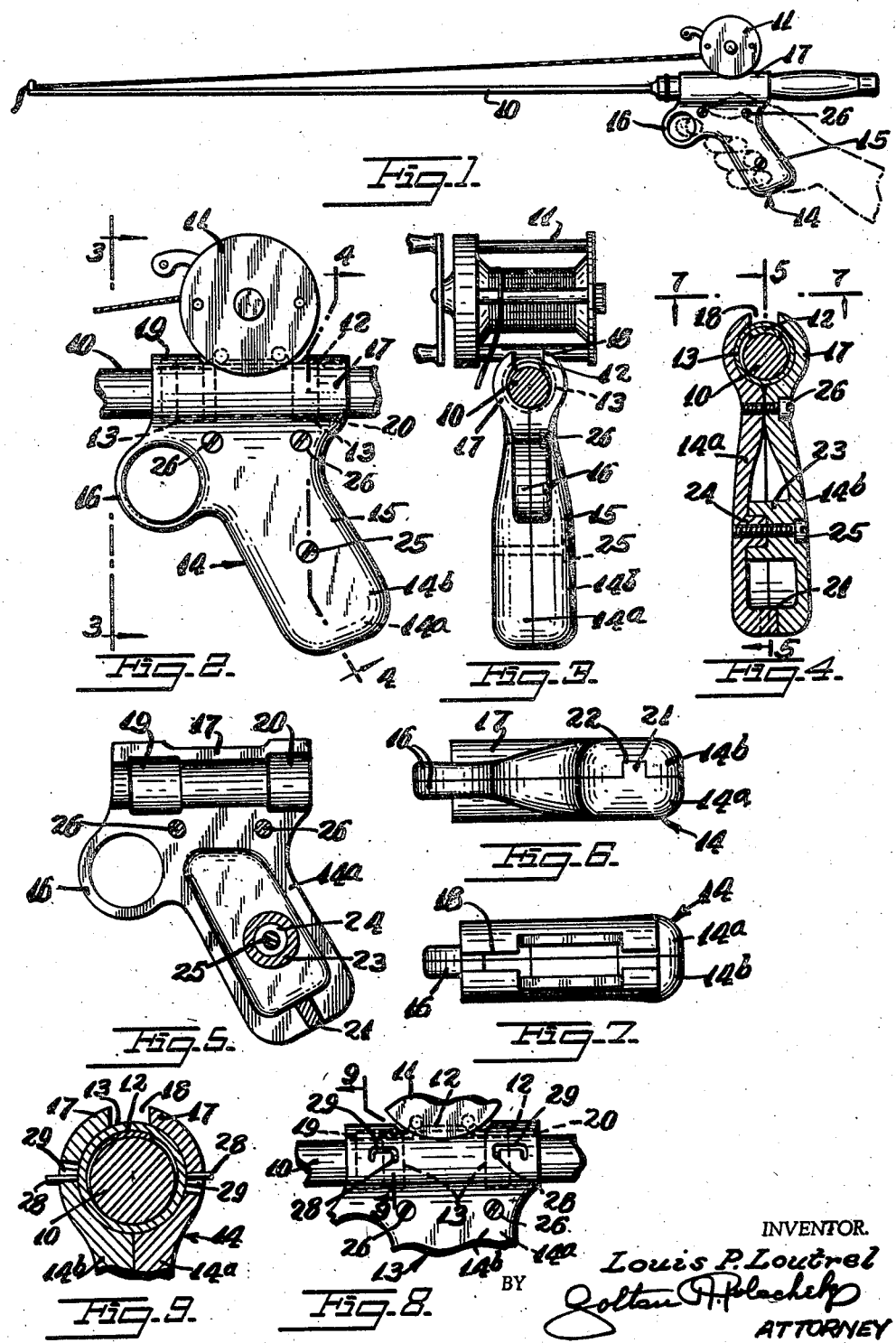

Patented May 19, 1942

2,283,816

UNITED STATES PATENT OFFICE 2,283,816

GRIP HANDLE FOR FISHING RODS

Louis P. Loutrel, Ozone Park, N. Y.

Application October 10, 1941, Serial No. 414,399

8 Claims. (Cl. 43—23)

This invention relates to new and useful improvements in a grip for bait casting rods.

More specifically, the invention proposes a grip which is a sure grip to securely hold the bait casting fishing rod during the casting operation, and subsequently during fishing.

More specifically, the invention relates to improvements in a bait casting fishing rod which is provided with a reel having a base engaging against the rod and held in position with collars slidably mounted on the rod and engaging over the ends of the base. The improvements include a handle of the pistol grip type having a trigger guard and composed of two side half sections having a cylindrical gripping portion encasing the rod and collars and being open at the top through which said base may pass when freed.

The invention contemplates a novel construction and arrangement for securely and releasably connecting said half sections together.

Still further a modified form is proposed in which the collars may be easily moved into and out of operative positions with relation to the base of the reel, without removing the handle.

For further comprehension of this invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a side elevational view of a bait casting fishing rod provided with a sure grip handle constructed in accordance with this invention.

Fig. 2 is a fragmentary enlarged detailed view of a portion of Fig. 1.

Fig. 3 is a sectional view taken on the line 3—3 of Fig. 2.

Fig. 4 is a sectional view taken on the line 4—4 of Fig. 2.

Fig. 5 is a sectional view taken on the line 5—5 of Fig. 4, but illustrated with the fishing rod removed.

Fig. 6 is a bottom view of Fig. 2 illustrated with the fishing rod removed.

Fig. 7 is a plan view looking in the direction of the line 7—7 of Fig. 4 but illustrated with the fishing rod removed.

Fig. 8 is a fragmentary elevation view similar to Fig. 2 but illustrating a modified construction.

Fig. 9 is a fragmentary enlarged sectional view taken on the line 9—9 of Fig. 8.

The sure grip handle, in accordance with this invention, is particularly intended for a bait casting fishing rod 10 which is provided with a reel 11 of standard construction having a base 12 engaging against the rod 10 and held in position with a pair of collars 13 slidably mounted on the rod and engaging over the ends of the base. The sure grip handle 14, in accordance with this invention, is composed of two half sections 14a and 14b, and is of a shape to have a palm engaging portion 15 and a trigger guard 16 in which the index finger may be engaged. The handle 14 is also provided with a cylindrical gripping portion 17 encasing the rod 10 and the collars 13 and having an open top 18 through which the base 12 of the reel 11 may pass when freed by slipping the collars 13 off its ends. The handle 14 is provided with internal cylindrical cavities 19 and 20 upon the interior of the cylindrical gripping portion 17 to accommodate the collars 13.

Means is provided for releasably connecting the half sections 14a and 14b of the handle 14. This means includes a tongue 21 formed on one of the sections and engaging a complementary groove 22 formed on the other of the sections. This tongue and groove is located at the bottom of the palm portion 15. Intermediately located on the palm portion 15, there is an internal cylindrical boss 23 which is engaged by a small complementary boss 24. These bosses are formed on the sections 14b and 14a, respectively. A screw 25 engages through one of the sides of the handle 14 and coaxially through the bosses 23 and 24 for releasably holding them together. The handle sections 14a and 14b are further held together by several screws 26 which engage through these sections.

The cavities 19 and 20 are of sufficient length so that the collars 13 may be located upon the ends of the base 12 or be slipped off these ends and still be located within the said cavities. With this arrangement it is merely necessary to loosen the holding screws 25 and 26 so as to slightly separate the sections 14a and 14b of the handle and then the reel 11 may be removed from or engaged on the fishing rod merely by slipping the collars 13, as required, by moving them through the top opening 18 of the handle. When the handle 14 is mounted on the fishing rod, as illustrated in Figs. 1 and 2, it may be gripped in the manner of a gun. It is then possible to cast effectively while maintaining a good grip on the handle 14.

In Figs. 8 and 9 a modified form of the invention has been disclosed which distinguishes from the prior form in the fact that each collar 13 is provided with a pair of diametrically opposite pins 28 which project through the bayonet slots 29 formed in the cylindrical portion 17 of the grip handle 14. The bayonet slots 29 have longitudinally extending central portions and offset ends, clearly shown on the drawing. These offset ends are so located that when the pins 28 are disposed in the adjacent ends of the bayonet slots 29 the collars 13 are in their operative positions on the ends of the base 12. When it is desired to remove the reel, the screws 26 are slightly loosened to free the collars 13 and then the pins 28 may be gripped, turned and moved to engage in the remote ends of the bayonet slots 29. The collars 13 are thus moved to the outer portions of the internal cylindrical cavities 19 and 20. They are now off the ends of the base 12 and the reel 11 is free and may be lifted up through the top opening 18 of the handle 14.

In other respects this form of the invention is similar to the previous form and like parts are identified by like reference numerals.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In combination, a bait casting fishing rod provided with a reel having a base engaging against said rod and held in position with collars slidably mounted on the rod and engaging over the ends of said base, a handle of the pistol grip type having a trigger guard and composed of two side half sections having a cylindrical gripping portion encasing said rod and collars and being open at the top through which said base may pass when freed, and means for releasably connecting said half sections together.

2. In combination, a bait casting fishing rod provided with a reel having a base engaging against said rod and held in position with collars slidably mounted on the rod and engaging over the ends of said base, a handle of the pistol grip type having a trigger guard and composed of two side half sections having a cylindrical gripping portion encasing said rod and collars and being open at the top through which said base may pass when freed, and means for releasably connecting said half sections together, said handle being formed with internal cylindrical cavities in which said collars are disposed.

3. In combination, a bait casting fishing rod provided with a reel having a base engaging against said rod and held in position with collars slidably mounted on the rod and engaging over the ends of said base, a handle of the pistol grip type having a trigger guard and composed of two side half sections having a cylindrical gripping portion encasing said rod and collars and being open at the top through which said base may pass when freed, and means for releasably connecting said half sections together, said handle being formed with internal cylindrical cavities in which said collars are disposed, the walls of said cylindrical cavities being adapted to engage said collars to clamp them stationarily in position when the half sections of the handle are tightly held by said connecting means.

4. In combination, a bait casting fishing rod provided with a reel having a base engaging against said rod and held in position with collars slidably mounted on the rod and engaging over the ends of said base, a handle of the pistol grip type having a trigger guard and composed of two side half sections having a cylindrical gripping portion encasing said rod and collars and being open at the top through which said base may pass when freed, and means for releasably connecting said half sections together, said handle being formed with internal cylindrical cavities in which said collars are disposed, the walls of said cylindrical cavities being adapted to engage said collars to clamp them stationarily in position when the half sections of the handle are tightly held by said connecting means, and said cavities being of sufficient length so that the collars may be moved off the ends of said base.

5. In combination, a bait casting fishing rod provided with a reel having a base engaging against said rod and held in position with collars slidably mounted on the rod and engaging over the ends of said base, a handle of the pistol grip type having a trigger guard and composed of two side half sections having a cylindrical gripping portion encasing said rod and collars and being open at the top through which said base may pass when freed, and means for releasably connecting said half sections together, said handle being formed with internal cylindrical cavities in which said collars are disposed, the walls of said cylindrical cavities being adapted to engage said collars to clamp them stationarily in position when the half sections of the handle are tightly held by said connecting means, and said cavities being of sufficient length so that the collars may be moved off the ends of said base, comprising a tongue on one of the half sections engaging the groove on the other of the half sections and screws connecting the half sections together.

6. In combination, a bait casting fishing rod provided with a reel having a base engaging against said rod and held in position with collars slidably mounted on the rod and engaging over the ends of said base, a handle of the pistol grip type having a trigger guard and composed of two side half sections having a cylindrical gripping portion encasing said rod and collars and being open at the top through which said base may pass when freed and means for releasably connecting said half sections together, said handle being formed with internal cylindrical cavities in which said collars are disposed, the walls of said cylindrical cavities being adapted to engage said collars to clamp them stationarily in position when the half sections of the handle are tightly held by said connecting means, and said cavities being of sufficient length so that the collars may be moved off the ends of said base, comprising a tongue on one of the half sections engaging the groove on the other of the half sections and screws connecting the half sections together, said half section being also provided with inter-engaging bosses, and one of said screws being engaged through said bosses.

7. In combination, a bait casting fishing rod provided with a reel having a base engaging against said rod and held in position with collars slidably mounted on the rod and engaging over the ends of said base, a handle of the pistol grip type having a trigger guard and composed of two side half sections having a cylindrical gripping portion encasing said rod and collars and being open at the top through which said base may pass when freed, means for releasably connecting said half sections together, and pins on said collars engaging bayonet slots in said cylindrical gripping portion by which the collars may be moved off and on the ends of base.

8. In combination, a bait casting fishing rod provided with a reel having a base engaging against said rod and held in position with collars slidably mounted on the rod and engaging over the ends of said base, a handle of the pistol grip type having a trigger guard and composed of two side half sections having a cylindrical gripping portion encasing said rod and collars and being open at the top through which said base may pass when freed, means for releasably connecting said half sections together, and pins on said collars engaging bayonet slots in said cylindrical gripping portion by which the collars may be moved off and on the ends of base, and internal cylindrical cavities in said cylindrical gripping portion in which said collars are disposed.

LOUIS P. LOUTREL.